(12) United States Patent  (10) Patent No.: US 8,919,469 B2
Shatters et al. (45) Date of Patent: Dec. 30, 2014

(54) VENTILATION SYSTEM FOR ENGINE AND AFTERTREATMENT COMPARTMENTS AND COMPONENTS

(75) Inventors: Dale Shatters, Plano, IL (US); Ryan Mann, DeKalb, IL (US); Scott Pozzie, Yorkville, IL (US); Sean McCurdy, Yorkville, IL (US); Christopher Wiley, Washington, IL (US); Manoj Kumar Bada Ghar Wala, Montgomery, IL (US)

(73) Assignee: Caterpillar Inc., Peoria, IL (US)

(*) Notice: Subject to any disclaimer, the term of this patent is extended or adjusted under 35 U.S.C. 154(b) by 468 days.

(21) Appl. No.: 12/869,324

(22) Filed: Aug. 26, 2010

(65) Prior Publication Data

US 2012/0048631 A1 Mar. 1, 2012

(51) Int. Cl.
*B60K 11/08* (2006.01)
*B60K 11/00* (2006.01)
*B60K 11/06* (2006.01)
*B60K 13/04* (2006.01)

(52) U.S. Cl.
CPC ............... *B60K 11/00* (2013.01); *B60K 11/06* (2013.01); *B60K 13/04* (2013.01); *B60Y 2200/413* (2013.01); *B60Y 2200/415* (2013.01)
USPC .......................................... 180/68.1; 180/68.2

(58) Field of Classification Search
USPC .............................. 180/68.1, 68.2; 123/41.31
See application file for complete search history.

(56) References Cited

U.S. PATENT DOCUMENTS

| 4,114,714 | A | | 9/1978 | Fachbach et al. |
|---|---|---|---|---|
| 4,241,702 | A | | 12/1980 | Takeuchi et al. |
| 4,339,014 | A | | 7/1982 | Berth et al. |
| 4,443,236 | A | | 4/1984 | Peiler |
| 4,610,326 | A | | 9/1986 | Kirchweger et al. |
| 5,590,624 | A | | 1/1997 | Emond et al. |
| 5,689,953 | A | * | 11/1997 | Yamashita et al. ............ 60/316 |
| 6,056,075 | A | * | 5/2000 | Kargilis ....................... 180/68.1 |
| 6,129,056 | A | | 10/2000 | Skeel et al. |
| 6,779,622 | B2 | * | 8/2004 | Mizorogi ....................... 180/297 |
| 6,922,925 | B2 | | 8/2005 | Watanabe et al. |
| 7,204,329 | B2 | | 4/2007 | Pfohl et al. |
| 7,380,623 | B2 | * | 6/2008 | Kim ........................... 180/68.1 |
| 7,481,287 | B2 | | 1/2009 | Madson et al. |
| 7,537,072 | B2 | * | 5/2009 | Sturmon et al. ............. 180/68.1 |
| 7,997,238 | B2 | * | 8/2011 | D'hondt et al. ............ 123/41.31 |
| 2007/0007061 | A1 | | 1/2007 | Meyer et al. |
| 2008/0142285 | A1 | * | 6/2008 | McCurdy et al. ............ 180/68.1 |
| 2010/0006361 | A1 | | 1/2010 | Vandike et al. |
| 2010/0071978 | A1 | | 3/2010 | Kisse |

FOREIGN PATENT DOCUMENTS

| JP | 2001027130 A | * | 1/2001 | ............. F02B 77/13 |
|---|---|---|---|---|
| WO | 0104474 | | 1/2001 | |
| WO | 2009108114 | | 9/2009 | |

* cited by examiner

*Primary Examiner* — Katy M Ebner
(74) *Attorney, Agent, or Firm* — Leydig, Voit & Mayer, Ltd.

(57) ABSTRACT

A ventilation system for a machine including an engine, an engine compartment having an interior, a secondary compartment having an interior, and a sensor. The ventilation system has a ventilation fan having a fan outlet, and a duct configured to direct air from the fan outlet to at least two of the interior of the engine compartment, the interior of the secondary compartment, and the sensor.

20 Claims, 7 Drawing Sheets

VENTILATION SYSTEM FOR ENGINE AND AFTERTREATMENT COMPARTMENTS AND COMPONENTS

TECHNICAL FIELD

This patent disclosure relates generally to the ventilation of engine compartments, and, more particularly to a ventilation system for engine and aftertreatment compartments and components.

BACKGROUND

Heat as well as environmental factors can contribute to reduced efficiencies and performance of engines, particularly those associated with machines such as large vehicles. Environmental factors, such as foreign debris and dirt that become trapped in the machine, likewise may inhibit efficient operation as well as the durability of machine components.

Aftertreatment systems are often utilized to reduce emissions associated with operation of engines. The State of California and the United States Environmental Protection Agency have imposed stricter emissions requirements over time, adopting increasingly stringent standards for criteria pollutants, such as $NO_x$, unburned hydrocarbons, carbon monoxide, sulfur dioxide, ozone, lead, and particulate matter. In addition to heat produced by engines themselves, Aftertreatment systems incorporated in order to meet such requirements have contributed to excessive heat in the operation of such machines. Excessive heat associated with the engine or the aftertreatment systems may be further increased due to insulating structures designed to minimize noise transmitted to the surroundings, including the passenger compartment.

Various arrangements have been proposed for cooling the engine and related components. For example, U.S. Pat. No. 4,114,714 to Fachbach, et al. discloses a forced draft ventilation system that includes a first fan that pulls air through front grill and the radiator, and a second fan that receives air from an external inlet port directed forward the vehicle and forces the air across the engine, a portion of the heated air then being directed out of the engine compartment, and a portion of the heated air then being directed across the exhaust system and out of the vehicle. Inasmuch as the second fan is driven by the engine and is depicted as a relatively small device, and the inlet to the second fan is directed forward the vehicle, it would appear that second fan is dependent, at large in part, upon the forward movement of the vehicle to force fresh air to the second fan. Accordingly, the second fan may be unable to reduce adequately the engine compartment temperatures during idling situations. Moreover, the air that is directed over the exhaust system has already been heated by moving over the engine itself, minimizing any resultant cooling of the exhaust components.

SUMMARY

The disclosure describes, in one aspect, a ventilation system for a machine including an engine, an engine compartment, a secondary compartment, and at least one sensor. The ventilation system comprises a ventilation fan having a fan outlet, and a duct configured to direct air from the fan outlet to at least two of the interior of the engine compartment, the interior of the secondary compartment, and the sensor.

In another aspect, the disclosure describes a ventilation system for a machine having a sound wall and an exterior, and including operative components. The ventilation system comprises a precleaner having a precleaner inlet and a precleaner outlet, a channel having a channel inlet and a channel outlet, a ventilation fan having a fan inlet and a fan outlet, at least one internal compartment substantially enclosing at least one of said operative components, at least one sensor, and at least one elongate duct. The precleaner inlet is in fluid communication with the exterior of the machine, while its outlet is in fluid communication with the channel inlet. The fan inlet is in fluid communication with the channel outlet, while the fan outlet is in fluid communication with the fan outlet. The duct directs air from the fan outlet to at least one of the compartment or the sensor.

In yet another aspect, the disclosure describes a machine including an exterior, a plurality of operative components, at least one compartment substantially enclosing at least one of said operative components, at least one sensor, a sound wall, a precleaner having a precleaner inlet and a precleaner outlet, a channel having a channel inlet and a channel outlet, a ventilation fan coupled to the sound wall, the ventilation fan having a fan inlet and a fan outlet, and at least one elongate duct. The precleaner inlet is in fluid communication with the exterior of the machine, while the precleaner outlet is in fluid communication with the channel inlet. The fan inlet is in fluid communication with the channel outlet, while the fan outlet is in fluid communication with the duct. The duct directs air from the fan outlet to at least one of the compartment or the sensor.

DETAILED DESCRIPTION

Figure 1:
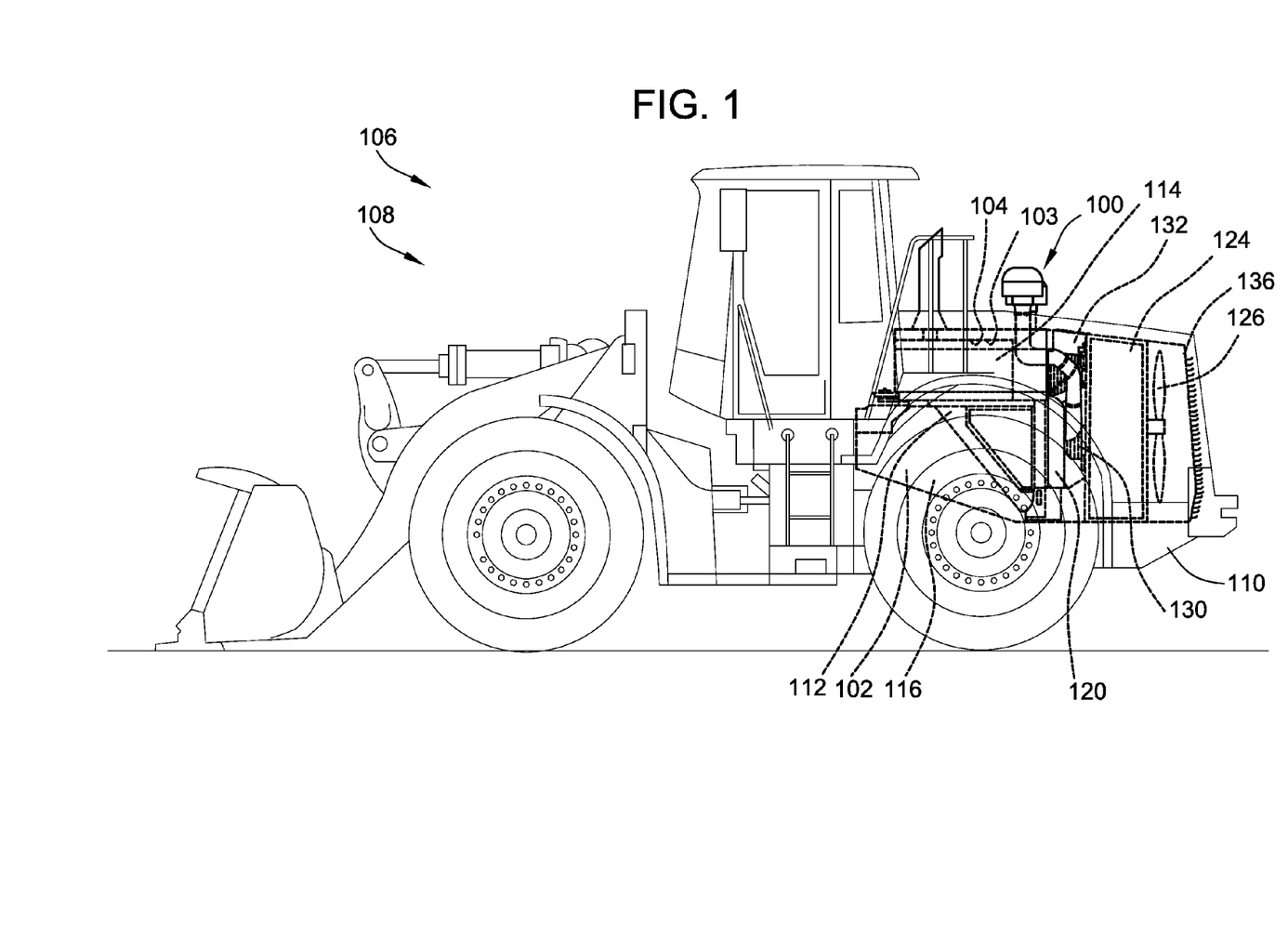
FIG. 1 is a schematic side elevational view of a wheel loader including the disclosed system.

This disclosure relates to a ventilation system 100 for one or more of engine compartment 102 and/or a secondary compartment 103, such as an aftertreatment housing 104 of a machine 106, such as a wheel loader 108 illustrated in FIG. 1, as well as the individual components of the engine or aftertreatment equipment. While the ventilation system 100 is illustrated in connection with a wheel loader 108, the ventilation system 100 disclosed herein has universal applicability in various other types of machines 106 as well. The term "machine" may refer to any machine that performs some type of operation associated with an industry such as mining, construction, farming, transportation, or any other industry known in the art. For example, the machine may be a wheel loader 108, a motor grader, a landfill or other type of compactor, or a wheel dozer. Moreover, one or more implements may be connected to the machine 106. Such implements may be utilized for a variety of tasks, including, for example, brushing, compacting, grading, lifting, loading, plowing, ripping, and include, for example, augers, blades, breakers/hammers, brushes, buckets, compactors, cutters, forked lifting devices, grader bits and end bits, grapples, blades, rippers, scarifiers, shears, snow plows, snow wings, and others.

Figure 2:
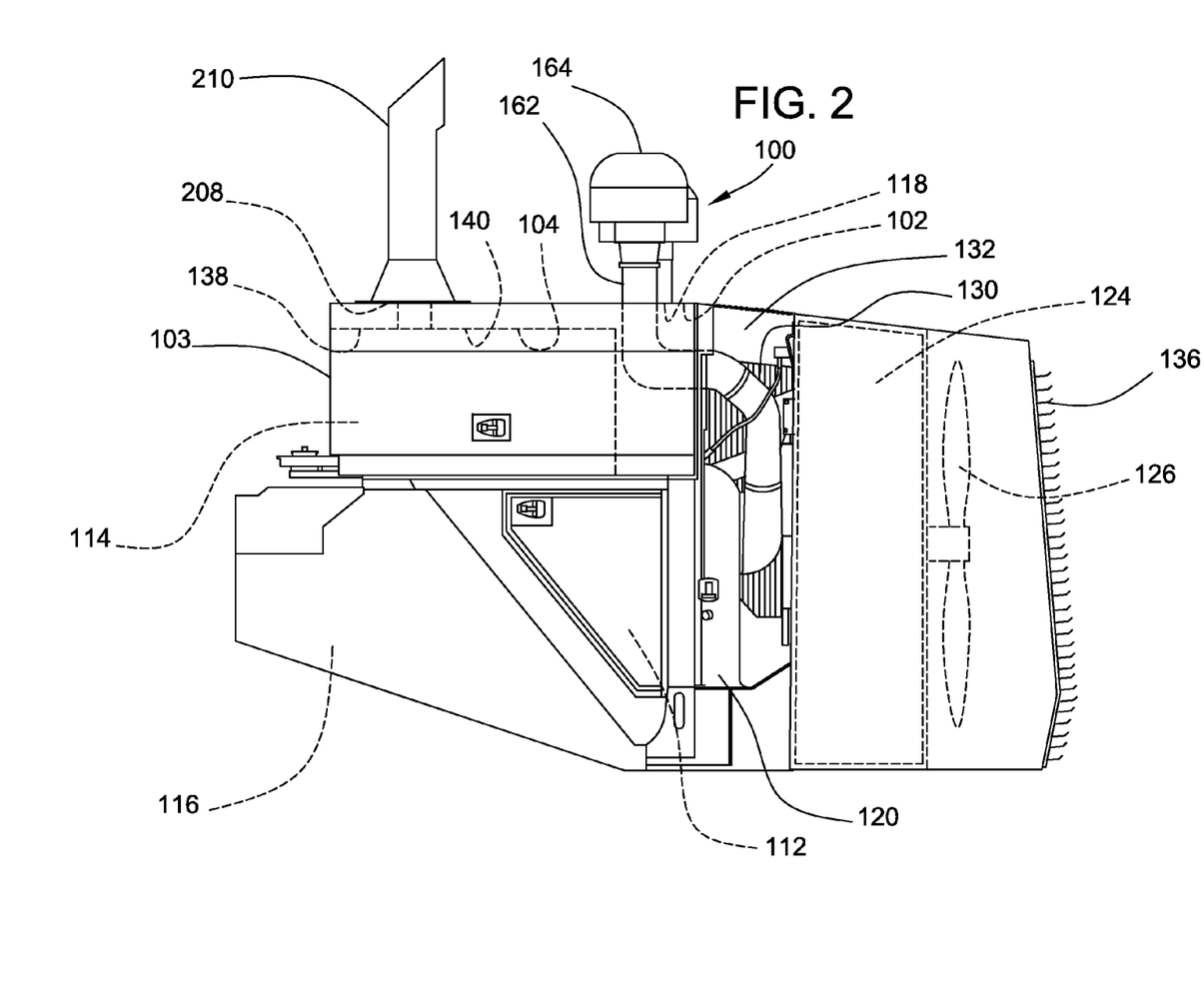
FIG. 2 is an enlarged fragmentary side view of an engine compartment, a secondary compartment, and the disclosed system utilized in the wheel loader of FIG. 1.

The illustrated wheel loader 108 includes a body 110 including the engine compartment 102, which houses an engine 112, and aftertreatment equipment 114, which receives exhaust from engine 112 (each of these items being shown generally in FIGS. 1 and 2). The machine 106 additionally includes a hydraulic system 116 (also shown generally in FIG. 2) that may include a plurality of components such as pumps, valves, and conduits, along with a hydraulic fluid reservoir (components not shown in detail). The hydraulic system 116, as well as other systems in the machine 106, may include its own cooling arrangement.

The engine compartment 102 defines an interior 118 that at least partially encloses the components of the engine 112, and may include one or more walls that are formed by, for example, interior surfaces of the body 110. In the illustrated embodiment, a soundwall 120 forms a portion of the engine compartment 102. In an embodiment, the engine compartment 102 is substantially closed, although some gaps exist that allow passage of air from inside of the engine compartment 102 to outside of the engine compartment.

The machine 106 may include a radiator 124 for cooling engine fluid, as well a radiator fan 126 disposed to cause movement of air across the radiator 124 to cool engine fluid. While the radiator fan 126 may be disposed to either draw or push the cooling air across the radiator 124, in the illustrated embodiment, the radiator fan 126 is disposed to draw air through vents 130 in the sides 132 of the machine 106 into the area surrounding the radiator 124, the radiator fan 126 drawing the air across the radiator 124 and out the back wall 136 of the machine 106.

Figure 4:
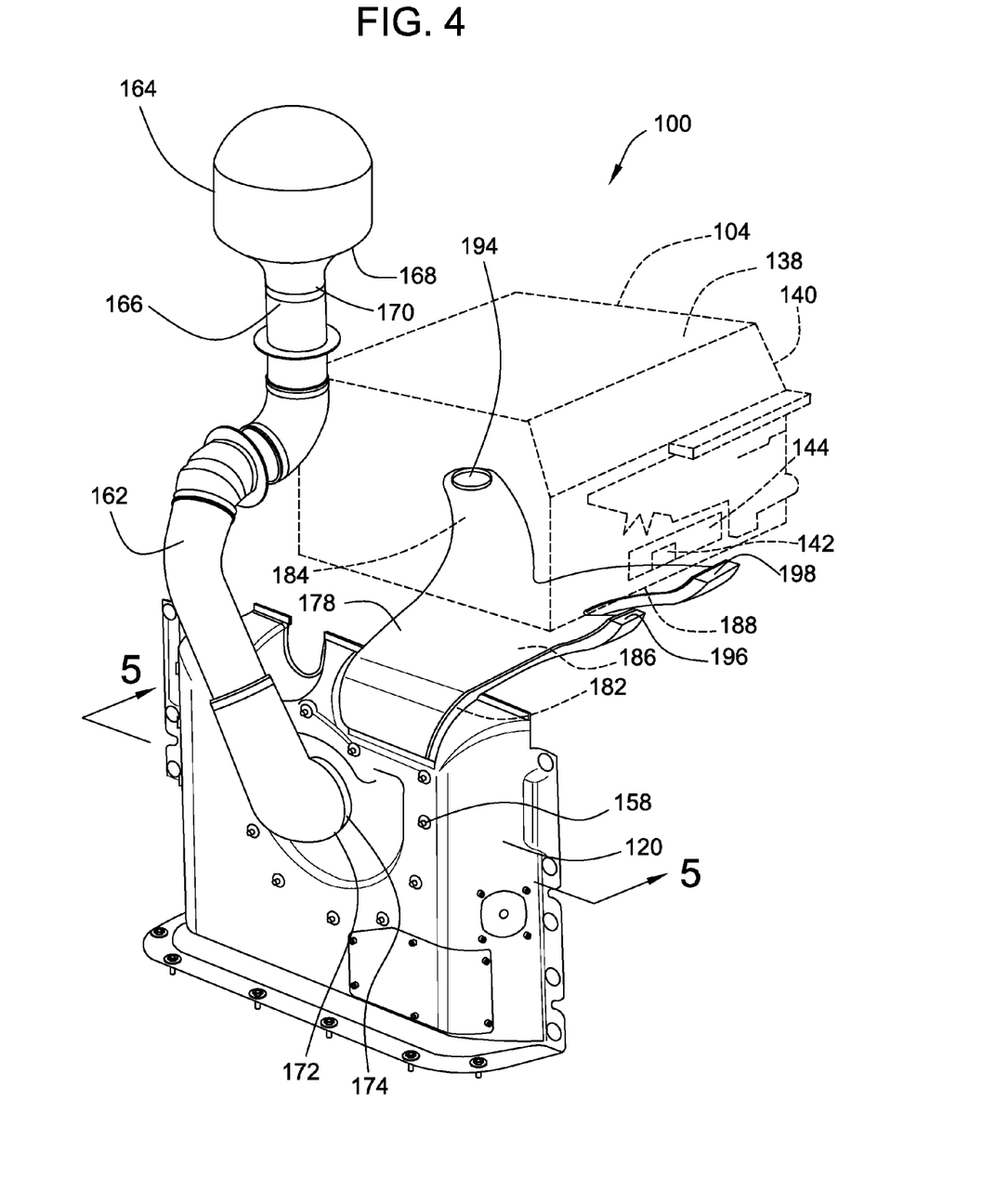
FIG. 4 is a fragmentary isometric view of the sound wall and ventilation system of FIGS. 2 and 3, the secondary compartment being shown in phantom.

The aftertreatment equipment 114 may include aftertreatment systems for reducing emissions, such as $NO_x$, unburned hydrocarbons, carbon monoxide, sulfur dioxide, ozone, lead, and particulate matter, contained in exhaust received from the engine 112 during operation. Such aftertreatment systems may include, for example, selective catalytic reduction (SCR), diesel oxidation catalysts (DOC), and diesel particulate filters (DPF), which are known in the art. One or more of these aftertreatment systems may be at least partially disposed within an interior 138 of the aftertreatment housing 104, which has a plurality of walls 140. The aftertreatment housing 104 may be contained substantially within the engine compartment 102, as shown, or it may be separate from the engine compartment 102. The aftertreatment equipment 114 may further include one or more sensors 142 and electrical components 144 (see, e.g., FIG. 4), which may be disposed within the aftertreatment housing 104 or, for example, along the exterior of the aftertreatment housing 104. The aftertreatment housing 104 may be formed of any suitable material, and may include insulating material. In the illustrated embodiment, the aftertreatment housing 104 is contained within the engine compartment 102, although, alternatively, the aftertreatment housing 104 may form a wall of the engine compartment 102.

The machine 106 further includes a ventilation system 100 that includes a ventilation fan 150, the output of which supplies cooling air to one or more of the components contained within the engine compartment 102 or the aftertreatment housing 104, or to the sensor 142. In the illustrated embodiment, a centrifugal ventilation fan 150 is utilized, although the ventilation fan 150 may be of any appropriate design and utilize any appropriate power source. Although the ventilation fan 150 may be electronically operated, battery powered, or directly coupled to the engine 112, an embodiment is hydraulically driven by a motor 152 (see FIG. 3) coupled to the hydraulic system 116. In this way, the output of the ventilation fan 150 is not directly affected by the output of the engine 112, allowing the ventilation fan 150 to operate at a desired speed, independent of the speed of the engine 112.

Figure 5:
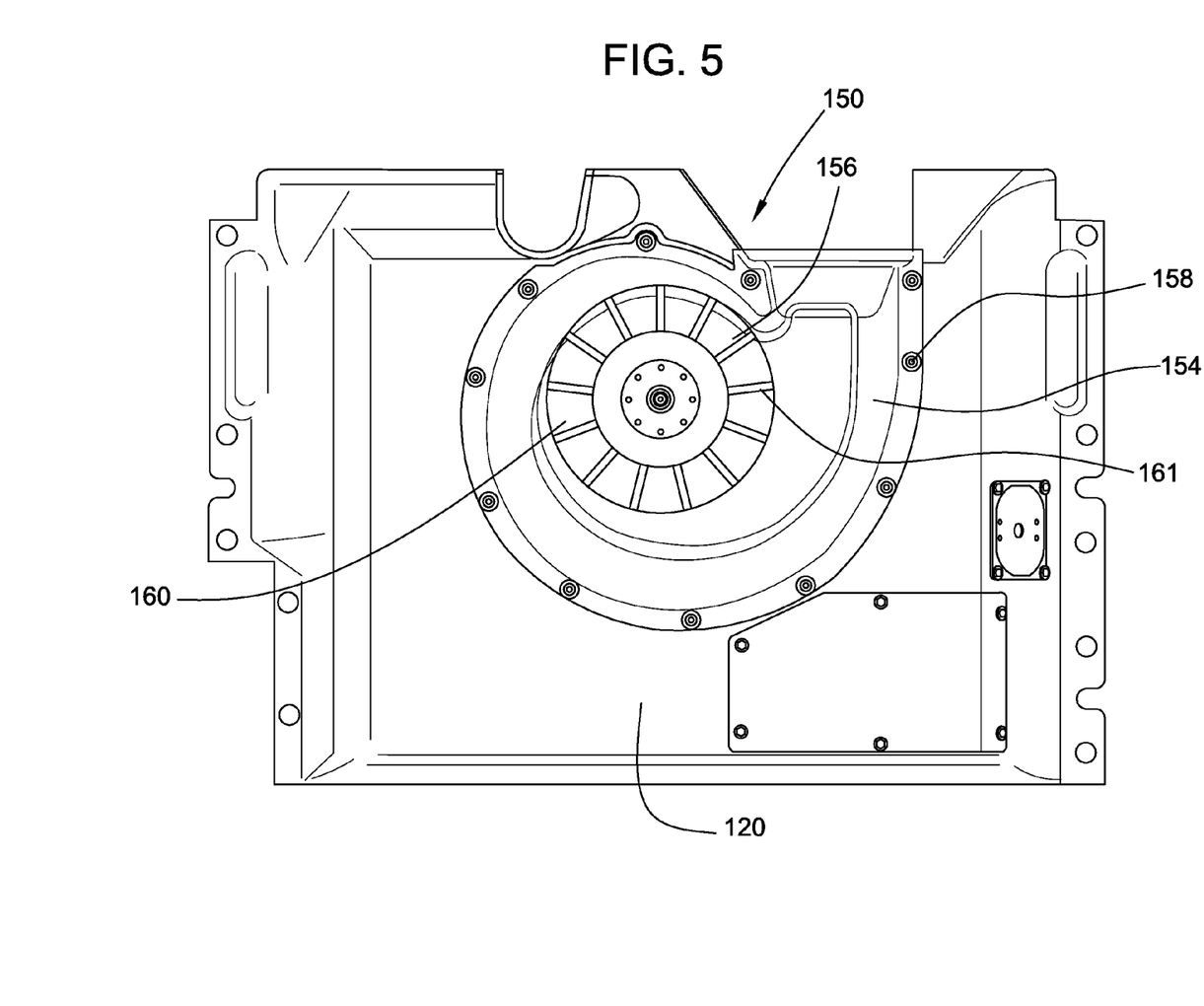
FIG. 5 is a fragmentary rear elevational view of the sound wall, partially cut away to show the fan blade.

The ventilation fan 150 of the illustrated embodiment is a centrifugal fan and includes a housing 154 with an impeller 156, as may be seen in FIG. 5. While the ventilation fan 150 may be disposed in any appropriate location, in the illustrated embodiment, the ventilation fan 150 is disposed along the soundwall 120, as may be seen in FIGS. 3-5. The housing 154 of the ventilation fan 150 is secured to the soundwall 120 by a plurality of fasteners 158, such as bolts. The soundwall 120 and the components of the ventilation fan 150 may be of any appropriate material. For example, in an embodiment, the housing 154 of the ventilation fan 150 is formed of an unsaturated polyester with glass mat reinforcement, or fiberglass, while the impeller 156 includes a steel back plate 160 with aluminum extruded fan blades 161.

Returning to FIGS. 3 and 4, air is supplied to the ventilation fan 150 through a channel 162 that extends from the housing 154 to the exteriors of the aftertreatment housing 104 and the engine compartment 102. In order to minimize debris entering the ventilation fan 150, the ventilation system 100 may further include a precleaner 164 disposed at an inlet 166 to the channel 162. In this way, air enters an inlet 168 to the precleaner 164 and flows from an outlet 170 of the precleaner 164 to the inlet 166 to the channel 162. Air then flows through the channel 162 and from an outlet 172 of the channel 162 to an inlet 174 to the ventilation fan housing 154.

The precleaner 164 may be of any custom or conventional design. The precleaner 164 may include, for example, an internally mounted impeller (not shown) that throws dirt and debris to the periphery of the precleaner 164 such that air passing through the precleaner 164 to the outlet 170 contains less dirt and/or debris than air entering the inlet 168 to the precleaner 164. In this way, having the inlet 168 to the precleaner 164—and ultimately, the inlet 174 to the ventilation fan housing 154—open to the exterior of the engine compartment 102, circulates cooling air that contains reduced dirt and/or debris. This effect may be enhanced by placement of the inlet 168 to the precleaner 164 at a location distal from structures and environments that would provide warmer and/or dirtier air, such as, for example, areas near machine wheels or a road.

According to the ventilation system 100, cooling air from an outlet 176 of the ventilation fan 150 is provided to at least one of the components of the engine compartment 102 or the aftertreatment housing 104, or to the sensor 142. In the illustrated embodiment, a duct 178 directs cooling air to each of the interiors 118, 138 of the engine compartment 102 and the aftertreatment housing 104, as well as to the aftertreatment sensor 142 disposed along the exterior of the aftertreatment housing 104.

Figure 3:
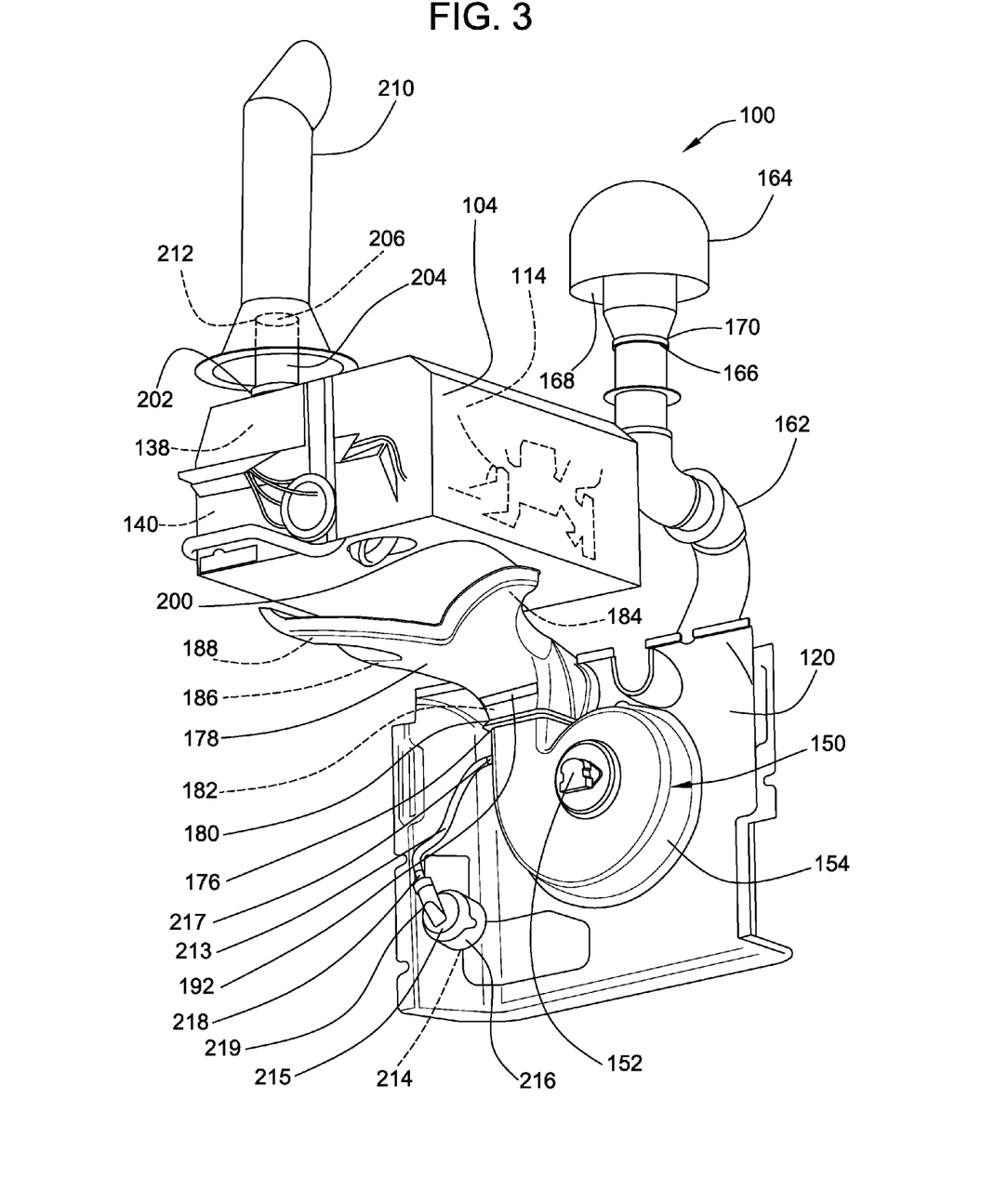
FIG. 3 is a fragmentary isometric view of the secondary compartment, the sound wall, and the ventilation system of FIG. 2, the engine compartment being cut away.
Figure 6:
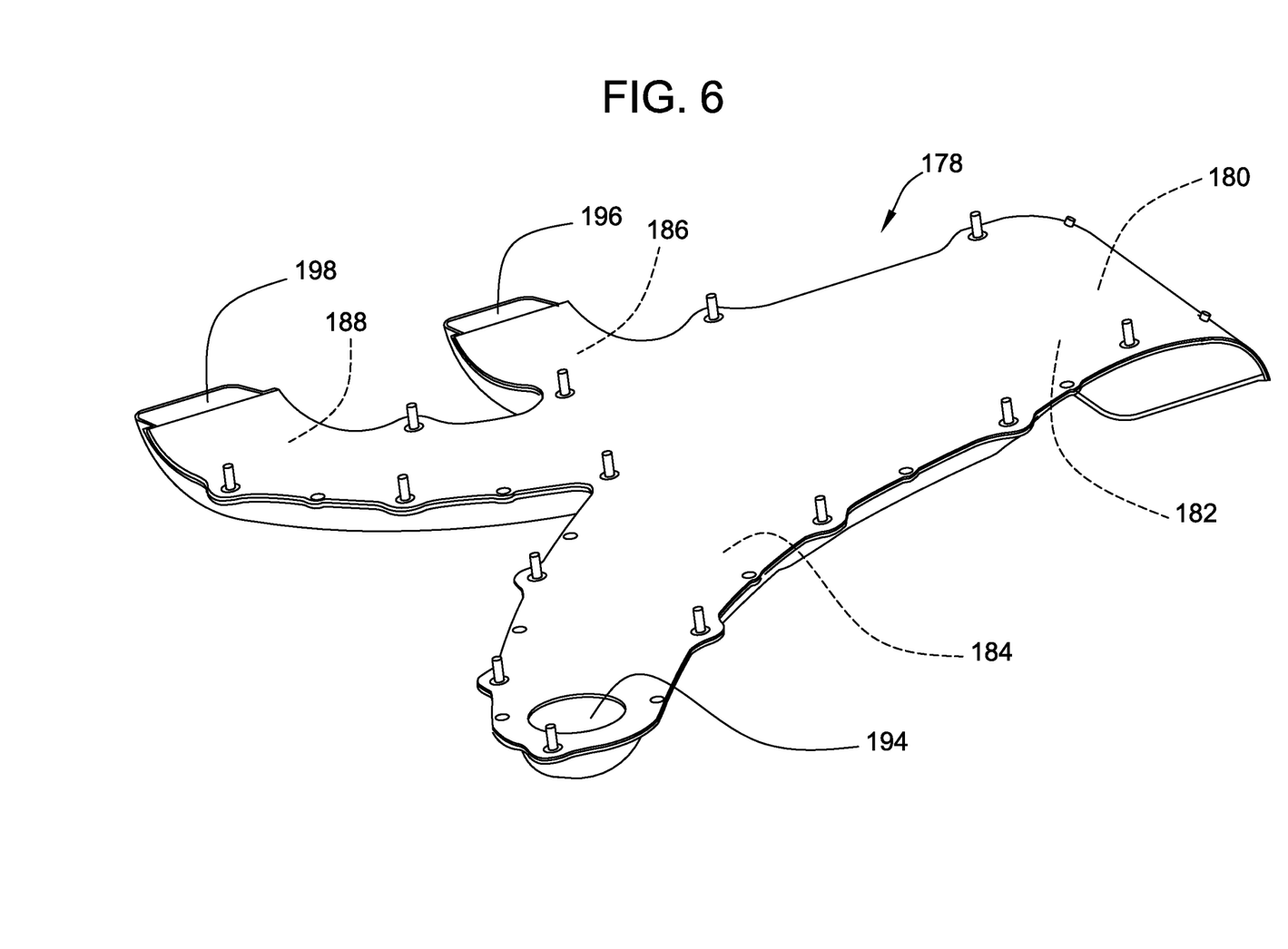
FIG. 6 is a fragmentary isometric view of the duct of FIGS. 2-4.
Figure 7:
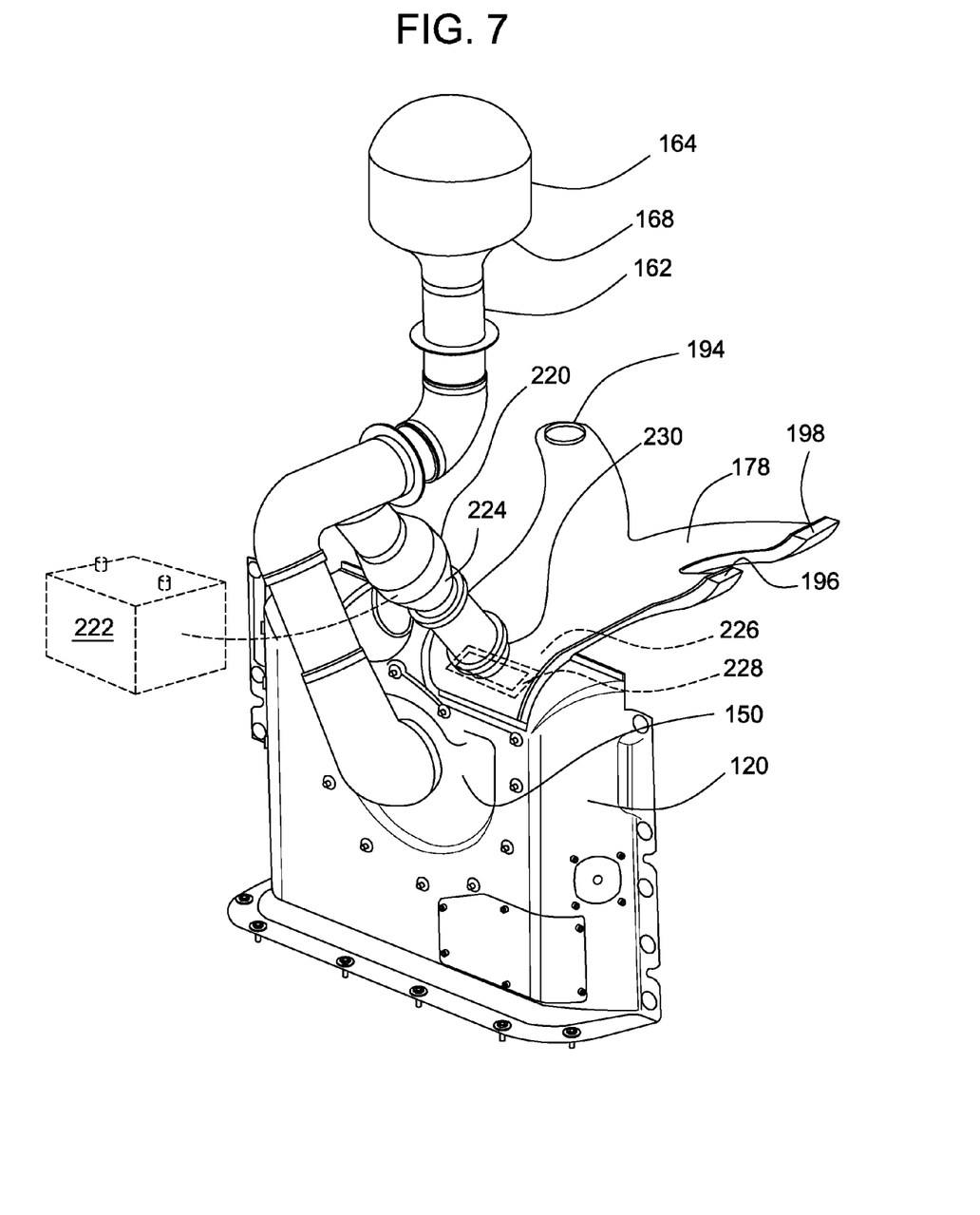
FIG. 7 is a fragmentary isometric view of the sound wall and an alternate embodiment of the ventilation system.

As may be seen in FIGS. 3, 6, and 7, the duct 178 contains an inlet 180 that is fluidly coupled to the outlet 176 of the ventilation fan 150, and internal passageways 182, 184, 186, 188 that direct cooling air to various outlets 192, 194, 196, 198. Outlet 192 directs cooling air into the engine compartment 102. Outlet 194 directs cooling air into an inlet 200 to the aftertreatment housing 104. Outlets 196 and 198 direct cooling air over the electrical components 144 and sensors 142 that control the operation of the aftertreatment systems contained within the aftertreatment housing 104. While the duct 178 has been described as a single duct, it may also be considered a plurality of ducts directed to various components of the machine 106. Those of skill will appreciate that the ducting structure could alternately include a plurality of single ducts in fluid communication with a single outlet or respective outlets of the ventilation fan 150 (not illustrated).

As shown in FIG. 3, an air hose or duct 213 may be provided to supply cooling air to individual engine components where individualized cooling may be desirable. For example, a duct 213 may be provided to the alternator 214, here through the alternator cover 215 into the alternator housing 216. An inlet 217 to the duct 213 is coupled to the ventilation fan housing 154 to provide fluid communication with the ventilation fan 150, while the outlet 218 of the duct 213 opens to an inlet 219 to the alternator cover 215. In this way, the ventilation fan 150 pushes cooling air into the alternator housing 216 to directly cool the alternator 214.

Returning to the cooling of the aftertreatment equipment 114, as the ventilation fan 150 pushes air into the aftertreatment housing 104 to cool the aftertreatment equipment 114 contained therein, air, now heated by the equipment 114 within the aftertreatment housing 104, is expelled from the aftertreatment housing 104 through an aftertreatment housing outlet 202 (FIG. 3). In order to carry the heated air away from the machine 106, the aftertreatment housing outlet 202 connects to an elongated stack 204, which is disposed at a top portion of the aftertreatment housing 104 in an embodiment. An outlet 206 of the elongated stack 204 exhausts heated air from the aftertreatment housing 104 a distance from the inlet 168 to the precleaner 164.

Inasmuch as the engine compartment 102 is substantially closed, the direct flow of cooling air from the duct outlet 192 into the engine compartment 102 may act to pressurize the engine compartment 102. Accordingly, this pressurization of the engine compartment 102 not only inhibits the passage of dirt or debris that may otherwise pass into the engine compartment 102 through any gaps in the walls defining the engine compartment 102, the pressure differential between the engine compartment 102 and the surrounding atmosphere may also cause the expulsion of such dirt and debris that may be disposed within the engine compartment 102.

In order to allow the escape of heated air from the engine compartment 102, an engine compartment outlet 208 (FIG. 2) is provided. In the illustrated embodiment, the engine compartment outlet 208 is provided near the upper portion of the engine compartment 102 to allow the rising heated air to escape. An elongated stack 210 is fluidly coupled to the outlet 208 of the engine compartment 102, allowing the heated air to rise up out of the engine compartment 102 and be exhausted at a distance from the inlet 168 to the precleaner 164.

According to an embodiment, the engine compartment outlet 208 and the elongated stack 210 of the engine compartment circumferentially surrounds the elongated stack 204 associated with the aftertreatment housing outlet 202. As may be seen in FIG. 3, in an embodiment, the outlet 206 of the aftertreatment housing elongated stack 204 extends only a portion of the height of the elongated stack 210 of the engine compartment 102. Accordingly, the nesting of these stacks 204, 210 acts as a venturi such that the heated air entering the elongated stack 204 from the aftertreatment housing 104 exits the outlet 206 at a distal end 212 of the stack 204 at a relatively high speed, creating an area of low pressure around the periphery of the distal end 212. As a result, the high speed, heated air leaving the aftertreatment housing stack 204 pulls with it the heated air within the engine compartment stack 210, carrying the heated air away from the machine 106.

In an alternate embodiment illustrated in FIG. 7, the ventilation system 100 additionally includes a supplemental blower 220 that is operative regardless of whether the engine 112 or hydraulic system 116 is in operation. The blower 220 is coupled to a continuous power source, here a battery 222, such that, when the operator turns off the engine 112, it will operate to cool the engine compartment 102, and/or aftertreatment housing 104, and/or the components thereof if signaled to do so by one or more appropriate sensors. The blower 220 is disposed in selective fluid communication with an air inlet, here the precleaner inlet 168, and the duct 178, here by a separate channel 224. A valving arrangement 226 may be provided to limit the flow of cooling air, depending upon which of the ventilation fan 150 or the blower 220 is in operation. The valving arrangement may include, for example, a flap 228 that is pivotably disposed to close an outlet 230 from the blower 220 when the ventilation fan 150 is in operation, and to close the outlet 176 from the ventilation fan 150 when the blower 220 is in operation. In this way, the hydraulically operated ventilation fan 150 may be in operation during use of the machine 106, and the blower 220 may be in operation once the machine 106 is shut down. In this way, when the engine 112 is turned off the blower 220 will draw air through the pre-cleaner 164 and blow the air through the duct 178, its internal passageways 182, 184, 186, 188, and the outlets 192, 194, 196, 198 to the hot components.

INDUSTRIAL APPLICABILITY

The present disclosure is applicable to machines 106 that include engines 112 and/or aftertreatment equipment 114 or systems that may require airflow to facilitate cooling or in which it is desirable to provide a cooling airflow. An embodiment may provide airflow to an engine compartment 102 and/or aftertreatment compartment 104 and related components to assist in controlled cooling of the compartments 102, 104 and components.

An embodiment of the disclosure may provide for pressurization of a compartment 102, 104, inhibiting the entrance of additional dirt or debris. Additionally, it may act to expel dirt and debris out of the compartment 102, 104 through gaps and openings.

An embodiment may include a precleaner 164, such that the air supplied to the ventilation fan 150 is typically cleaner than the air surrounding the machine 106. This may be particularly useful when the machine 106 is utilized in industrial or off road environments. Moreover, with the precleaner 164 in a location on the machine 106 that is spaced from the road or wheels of a vehicle, for example, air entering the ventilation fan 150 likely includes less dirt and debris than would be the case when the air provided to the ventilation fan 150 is supplied from near the road.

In an embodiment, the ventilation fan 150 is a hydraulically operated centrifugal fan. The hydraulic drive may continue to provide high volumes of filtered airflow even as the engine output is decreased.

The utilization of a venturi stack in an embodiment exhausts the heated air from the engine compartment 102 and/or the aftertreatment housing 104 a distance from the precleaner 164, minimizing the opportunity for heated air to be drawn into the ventilation system 100. Additionally, the utilization of a venturi stack may minimize paths for the escape of sound from the engine compartment 102 and aftertreatment housing 104. Further, inclusion of the venturi stack may dilute the engine exhaust temperature with cooler ventilation air, expelling the cooled exhaust air away from the cooling system air intakes.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A ventilation system for a machine including an engine, an engine compartment having an interior, an aftertreatment housing having an interior, aftertreatment equipment disposed within the interior of the aftertreatment housing, and at least one sensor coupled to the aftertreatment housing, a radiator, and a radiator fan, the ventilation system comprising:
   a ventilation fan at least partially enclosed by a fan housing and having a fan outlet, the ventilation fan being separate from the radiator fan, and
   an elongated duct extending from the fan housing and configured to direct air from the fan outlet to at least two of the interior of the engine compartment, the interior of the aftertreatment housing, and the sensor.

2. The system of claim 1, further including:
   a precleaner having a precleaner inlet and a precleaner outlet, the precleaner inlet being open to an exterior of the engine compartment, and
   a channel having a channel inlet and a channel outlet, the channel inlet being in fluid communication with the precleaner outlet, the channel outlet being in fluid communication with the ventilation fan.

3. The system of claim 1, wherein the duct directs air to the engine compartment interior to pressurize the engine compartment.

4. The system of claim 1, wherein the duct includes at least three outlets for directing air from the fan outlet to the interior of the engine compartment, the interior of the aftertreatment housing, and the sensor, respectively.

5. The system of claim 1 further including a secondary blower disposed to selectively provide cooling air to the duct for delivery to the at least two of the interior of the engine compartment, the interior of the aftertreatment housing and the sensor.

6. The system of claim 1 wherein the ventilation fan does not receive air flowing through the radiator or direct air to the radiator.

7. A ventilation system for a machine, the machine including an engine, a radiator, and a radiator fan, the system comprising:
   a precleaner having a precleaner inlet and a precleaner outlet, the precleaner inlet being in fluid communication with an exterior of the machine,
   a channel having a channel inlet and a channel outlet, the channel inlet being in fluid communication with the precleaner outlet,
   a ventilation fan at least partially enclosed by a fan housing and having a fan inlet and a fan outlet, the fan inlet being in fluid communication with the channel outlet, the ventilation fan being separate from the radiator fan,
   an engine compartment substantially enclosing the engine,
   at least one sensor, and
   an elongate duct extending from the fan housing, the elongate duct being in fluid communication with the fan outlet and directing air from the fan outlet to the engine compartment and the sensor.

8. The system of claim 7, further including an aftertreatment housing having an interior, and aftertreatment equipment at least partially enclosed within the aftertreatment housing interior, and the duct directing air from the ventilation fan outlet to the aftertreatment housing interior.

9. The system of claim 8, wherein the ventilation fan substantially pressurizes the engine compartment.

10. The system of claim 9, wherein the aftertreatment housing includes an aftertreatment housing outlet, and the engine compartment includes an outlet, the aftertreatment housing outlet and the engine compartment outlet forming a venturi arrangement.

11. The system of claim 10, further including an aftertreatment housing elongated stack associated with the aftertreatment housing outlet, and an engine compartment elongated stack associated with the engine compartment outlet, the engine compartment elongated stack circumferentially surrounding the aftertreatment housing elongated stack.

12. The system of claim 11, wherein the engine compartment elongated stack has a length, and wherein the aftertreatment housing elongated stack extends only a portion of the length of the engine compartment elongated stack, the aftertreatment housing outlet being disposed within the engine compartment elongated stack.

13. The system of claim 9, wherein the aftertreatment housing has an exterior, the at least one sensor is associated with the aftertreatment equipment and is disposed at the exterior of the aftertreatment housing, the duct directing air from the ventilation fan outlet to the sensor.

14. The system of claim 13, wherein the duct includes a plurality of duct outlets, the duct directing air from the ventilation fan outlet through the plurality of duct outlets to the interior of the engine compartment, the aftertreatment housing interior, and the sensor.

15. The system of claim 13, wherein the machine includes a sound wall, and the ventilation fan is coupled to the sound wall.

16. The system of claim 7, further including a secondary blower disposed to selectively provide cooling air to the duct for delivery to the engine compartment and the sensor wherein the secondary blower is coupled to a continuous power source, the secondary blower being operable regardless of whether the engine is in operation.

17. The system of claim 7 wherein the ventilation fan does not receive air flowing through the radiator or direct air to the radiator.

18. A machine comprising:
   an exterior,
   an engine,
   aftertreatment equipment,
   a radiator, a radiator fan, a precleaner having a precleaner inlet and a precleaner outlet, the precleaner inlet being in fluid communication with the exterior of the machine, a channel having a channel inlet and a channel outlet, the channel inlet being in fluid communication with the precleaner outlet, a ventilation fan at least partially enclosed by a fan housing, the ventilation fan having a fan inlet and a fan outlet, the fan inlet being in fluid communication with the channel outlet, the ventilation fan being separate from the radiator fan, an engine compartment having an exterior and an interior substantially enclosing the engine, an aftertreatment housing having an interior at least partially enclosing said aftertreatment equipment, at least one sensor, and an elongate duct extending from the fan housing, the elongate duct being in fluid communication with the fan outlet and directing air from the fan outlet to at least two of the engine compartment, the aftertreatment housing, and the sensor.

19. The machine of claim 18, wherein the duct includes at least three duct outlets, a first of said duct outlets directing air from the fan outlet to the interior of the engine compartment, a second of said duct outlets directing air from the fan outlet to the interior of the aftertreatment housing, and a third of said duct outlets directing air from the fan outlet to the sensor.

20. The machine of claim 19 further including a secondary blower disposed to selectively provide cooling air to the duct for delivery to the at least two of the interior of the engine compartment, the interior of the aftertreatment housing and the sensor.

* * * * *

UNITED STATES PATENT AND TRADEMARK OFFICE
CERTIFICATE OF CORRECTION

PATENT NO. : 8,919,469 B2
APPLICATION NO. : 12/869324
DATED : December 30, 2014
INVENTOR(S) : Dale Shatters et al.

Page 1 of 1

It is certified that error appears in the above-identified patent and that said Letters Patent is hereby corrected as shown below:

On the title page, item 75, change "Christopher Wiley" to --Christopher Willey--

Signed and Sealed this
Fifth Day of April, 2016

Michelle K. Lee
*Director of the United States Patent and Trademark Office*